United States Patent
Wang et al.

(10) Patent No.: US 12,448,092 B2
(45) Date of Patent: Oct. 21, 2025

(54) OFFSHORE FLOATING PLATFORM DEVICE, CONSTRUCTION METHOD AND OPERATION METHOD

(71) Applicant: Shanghai Investigation, Design & Research Institute Co., Ltd., Shanghai (CN)

(72) Inventors: Zhaohui Wang, Shanghai (CN); Qing Gui, Shanghai (CN); Xiangwei Lu, Shanghai (CN)

(73) Assignee: Shanghai Investigation, Design & Research Institute Co., Ltd., Shanghai (CN)

( * ) Notice: Subject to any disclaimer, the term of this patent is extended or adjusted under 35 U.S.C. 154(b) by 0 days.

(21) Appl. No.: 18/574,340

(22) PCT Filed: Feb. 17, 2023

(86) PCT No.: PCT/CN2023/076693
§ 371 (c)(1),
(2) Date: Dec. 27, 2023

(87) PCT Pub. No.: WO2024/124687
PCT Pub. Date: Jun. 20, 2024

(65) Prior Publication Data
US 2025/0289537 A1    Sep. 18, 2025

(30) Foreign Application Priority Data

Dec. 12, 2022   (CN) .......................... 202211598261.9

(51) Int. Cl.
*B63B 35/44* (2006.01)
*B63B 35/34* (2006.01)
(Continued)

(52) U.S. Cl.
CPC .............. *B63B 35/44* (2013.01); *B63B 35/34* (2013.01); *B63B 39/06* (2013.01); *B63B 75/00* (2020.01);
(Continued)

(58) Field of Classification Search
CPC ......... B63B 35/44; B63B 35/34; B63B 39/06; B63B 75/00
See application file for complete search history.

(56) References Cited

U.S. PATENT DOCUMENTS

| 10,982,654 B1* | 4/2021 | Dehlsen .................. B63B 35/44 |
| 2009/0072544 A1* | 3/2009 | Pao .......................... B63B 21/16 290/55 |
| 2020/0307745 A1* | 10/2020 | Aguire Suso ........... B63B 39/03 |

FOREIGN PATENT DOCUMENTS

| AU | 2018372057 A | 5/2020 |
| CN | 105775045 A | 7/2016 |

(Continued)

OTHER PUBLICATIONS

Chen Jiahao, Pei Aiguo, Ma Zhaorong, Pang Chengyan, A Review of the Key Technologies for Floating Offshore Wind Turbines, Southern Energy Construction, Mar. 25, 2020, pp. 14-26, vol. 7 No. 1, China Academic Journals Electronic Publishing House, CN.

(Continued)

*Primary Examiner* — S. Joseph Morano
*Assistant Examiner* — Jovon E Hayes
(74) *Attorney, Agent, or Firm* — IPRTOP LLC

(57) ABSTRACT

An offshore floating platform device, a construction method, and an operation method are provided. The device includes a pontoon carrier component. The pontoon carrier component includes a pontoon provided with a counterweight body at a bottom and a central cylinder at a top. The pontoon is provided with an anchor chain assembly on its outer cylin- (Continued)

drical surface for keeping the elevation of the pontoon carrier component in the sea. A platform is arranged around an edge of a top surface of the central cylinder. Multiple tower bases are provided on a top surface of the central cylinder for installing a tower of the wind turbine. A buoyancy support component is provided on an outer cylindrical surface of the central cylinder, and the buoyancy support component ascends and descends as it rolls along the outer cylindrical surface of the central cylinder in response to changes in water level.

9 Claims, 14 Drawing Sheets

(51) Int. Cl.
  *B63B 39/06* (2006.01)
  *B63B 75/00* (2020.01)
  *F03D 13/20* (2016.01)
  *F03D 13/25* (2016.01)

(52) U.S. Cl.
  CPC ......... *F03D 13/201* (2023.08); *F03D 13/256* (2023.08); *B63B 2035/446* (2013.01); *B63B 2039/067* (2013.01); *F05B 2240/93* (2013.01); *F05B 2240/95* (2013.01)

(56) References Cited

FOREIGN PATENT DOCUMENTS

| | | | |
|---|---|---|---|
| CN | 106882336 | A | 6/2017 |
| CN | 108146588 | Y | 6/2018 |
| CN | 108583795 | A | 9/2018 |
| CN | 208102275 | A | 11/2018 |
| CN | 109737014 | A | 5/2019 |
| CN | 110259645 | A | 9/2019 |
| CN | 110525599 | A | 12/2019 |
| CN | 209964974 | A | 1/2020 |
| CN | 111907642 | A | 11/2020 |
| CN | 211918946 | A | 11/2020 |
| CN | 113819001 | A | 12/2021 |
| CN | 216809972 | A | 6/2022 |
| CN | 115158549 | A | 10/2022 |
| CN | 217893155 | A | 11/2022 |
| DE | 102012007613 | A | 10/2013 |
| JP | 2014173579 | A | 9/2014 |
| JP | 2016016811 | A | 2/2016 |
| KR | 20120014657 | A | 2/2012 |
| KR | 101957037 | A | 3/2019 |
| KR | 102437203 | A | 9/2022 |
| WO | 2013040871 | A | 3/2013 |
| WO | 2013120264 | A | 8/2013 |
| WO | 2021219739 | A | 11/2021 |
| WO | 2022236677 | A | 11/2022 |

OTHER PUBLICATIONS

Yang Xin, 海上风电机组与支撑结构-体化疲劳分析 (Non-official translation: Fatigue Analysis of Integrated Offshore Wind Turbine and Support Structure), Journal of Green Science and Technology, May 30, 2022, pp. 35-43, Issue No. 10, China Academic Journals Electronic Publishing House, CN.

Wang Yue, Fu Xiya, He Wenkun, Li Pengfei, Han Suyu, A Research on the Wave Stability of Prefabricated SEMI Floating Bucket Foundation, Naval Architecture and Ocean Engineering, Apr. 25, 2021, pp. 45-48, Issue No. 2, China Academic Journals Electronic Publishing House, CN.

\* cited by examiner

OFFSHORE FLOATING PLATFORM DEVICE, CONSTRUCTION METHOD AND OPERATION METHOD

TECHNICAL FIELD

The present disclosure relates to the technical field of offshore wind power generation, and particularly to an offshore floating platform device, a construction method, and an operation method.

BACKGROUND

Offshore wind energy development has become a hot spot in the global power technology competition. China has more than 18,000 kilometers of mainland coastline and 3 million square kilometers of marine territory, therefore, the offshore wind energy resources are abundant and have huge development potential. It is estimated that waters with a depth of around 50 meters could potentially generate 500 million kilowatts of wind power. With the development of near-shore resources tending to saturate, offshore wind power development has been gradually moving towards deep-sea areas, in which the water depth is increasing. If fixed platforms such as pile foundations are used in the ocean with depths of several tens of meters, the investment and construction difficulty are high, and operation and management are also inconvenient. Installing wind turbines on floating platforms is a better choice to solve the above problems.

Due to the large total weight of the tower and the wind turbine installed on the tower of the offshore wind generating unit, the required structural strength and the buoyancy provided by the floating platform are relatively high. Currently, there are generally column-type, tension-leg type, semi-submersible type, and barge-type floating platforms for offshore wind generating units. Their common shortcoming is that they cannot autonomously dynamically balance in the waves, and can only sway with the waves, which affects the operation and safety of the wind turbine, thereby affecting the power generation of the wind turbine.

SUMMARY

The present disclosure provides an offshore floating platform device, a construction method, and an operation method. A pontoon carrier component can automatically resist wind and waves and maintain a balanced state through the buoyant support effect of a buoyancy support component, ensuring the stability of the wind power generation equipment.

The present disclosure provides the following technical solutions.

An offshore floating platform device includes a pontoon carrier component. The pontoon carrier component includes a pontoon, the pontoon is provided with a counterweight body at a bottom and a central cylinder at a top. The pontoon is provided with an anchor chain component on its outer cylindrical surface for keeping the elevation of the pontoon carrier component in the sea. A platform is arranged around an edge of a top surface of the central cylinder. Multiple tower bases are provided on a top surface of the central cylinder for installing a tower of the wind turbine. A buoyancy support component is provided on an outer cylindrical surface of the central cylinder, and the buoyancy support component ascends and descends as it rolls along the outer cylindrical surface of the central cylinder in response to changes in water level.

Further, a diameter of the pontoon is larger than a diameter of the central cylinder, and the central cylinder is in a middle of a top surface of the pontoon; the tower bases are distributed around the top surface of the central cylinder; multiple vertical partitions are evenly distributed around a circumference in the pontoon, and the vertical partitions are connected through multiple horizontal partitions from top to bottom, forming multiple pontoon chambers; multiple horizontal partitions are sequentially arranged from top to bottom in the central cylinder, forming multiple central cylinder chambers; a ladder is provided on an inner wall of the central cylinder; the pontoon chambers and the central cylinder chambers are intercommunicated, and part of the pontoon chambers are provided with an anchor chain chamber and anchor machine for installing the anchor chain component.

Further, the counterweight body includes an arc-shaped counterweight and a balancing counterweight. An axis of the arc-shaped counterweight coincides with an axis of the pontoon; the arc-shaped counterweight includes an arc-shaped steel mesh, a top of the arc-shaped steel mesh is provided with an opening; a diameter of the opening is equal to a diameter of the pontoon; a top of the arc-shaped steel mesh is connected to the bottom of the pontoon; where an inner surface of the arc-shaped steel mesh is bonded with geotextile to form an arc-shaped cavity, in which multiple suspension bars are installed; one end of each of the suspension bars is connected to the arc-shaped steel mesh, and the other end is connected to the bottom of the pontoon; where multiple filling holes are provided on a bottom plate of the pontoon for pouring concrete into the arc-shaped cavity; and the balancing counterweight is placed at the bottom within the pontoon for adjusting balance of the pontoon carrier component after installation of the wind turbine.

Further, the buoyancy support component includes two symmetrical semi-circular ring-shaped pontoon boxes; the two pontoon boxes are arranged around an outer side of the central cylinder and are spliced to form a pontoon box body; the pontoon box body is located below a sea surface; multiple columns are evenly distributed on an inner edge of a top surface of each of the two pontoon boxes; the columns are connected from top to bottom through multiple horizontal arc beams to form one force transmission frame; two force transmission frames are arranged around the outer side of the central cylinder and spliced to form a force transmission frame body; where an inner side of the arc beams is provided with an arc-shaped slot having a conforming shape with the arc beams; multiple rollers are provided in the arc-shaped slot; the rollers are in rolling contact with the outer cylindrical surface of the central cylinder; multiple buoyancy support assemblies are provided on an outer side of the arc beams at a top of the columns in a circumferential direction of the central cylinder.

Further, the buoyancy support assemblies are uniformly distributed along a circumference of the central cylinder; each of the buoyancy support assemblies includes an arc-shaped rod with a concave side facing downwards; a top of the arc-shaped rod is connected to a corresponding position on the outer side of the arc beams, and a bottom of the arc-shaped rod is provided with a hollow floating column; a bottom of the floating column is higher than a static water level.

Further, each of two ends of each of the two pontoon boxes is provided with a vertical and outward-extending pontoon box connecting plate, and the pontoon box connecting plates at corresponding ends of the two pontoon boxes are connected by bolts; a vertical and outward-extending frame connecting plate is provided at the column on each of two ends of each of the two force transmission frames; the frame connecting plates at corresponding ends of the two force transmission frames are connected by bolts.

Further, the anchor chain assembly includes multiple upper anchor chain components uniformly arranged around an upper end of the outer cylindrical surface of the pontoon and multiple lower anchor chain components uniformly arranged around a lower end of the outer cylindrical surface of the pontoon; where each of the upper anchor chain components includes an upper anchor chain inclined outward and downward; an upper end of the upper anchor chain is connected to a corresponding position on the upper end of the outer cylindrical surface of the pontoon, and a lower end of the upper anchor chain is connected to an upper mooring located on a seabed; where each of the lower anchor chain components includes a lower anchor chain inclined outward and downward; an upper end of the lower anchor chain is connected to a corresponding position on the lower end of the outer cylindrical surface of the pontoon, and a lower end of the lower anchor chain is connected to a lower mooring located on the seabed; the upper anchor chains and the lower anchor chains are arranged in a staggered manner.

The present disclosure further provides a method for constructing an offshore floating platform device. The method includes:

S1, producing the pontoon, the counterweight body, the central cylinder, the platform, the buoyancy support component, and the anchor chain assembly by a factory;

S2, assembling the counterweight body and the center cylinder to the pontoon respectively, assembling the platform with the center cylinder to obtain the pontoon carrier component, and towing the pontoon carrier component in water to an on-site water area;

S3, on a top surface of the pontoon, mounting the buoyancy support component on the outer cylindrical surface of the center cylinder;

S4, when a water level in the on-site water area reaches a lowest level, loading sandbags on a top of the platform to enable an elevation of the top of platform to be a design elevation in which the wind turbine is installed; installing the anchor chain assembly on the outer cylindrical surface of the pontoon;

S5, installing the tower on the top surface of the central cylinder, gradually unloading the sandbags on the platform, and installing the wind turbine on a top of the tower.

Further, in S1, the producing of the counterweight body by the factory includes: producing an arc-shaped steel mesh of the counterweight body and multiple suspension bars by the factory, bonding geotextile on an inner surface of the arc-shaped steel mesh, connecting one end of each of the suspension bars to the arc-shaped steel mesh, and producing a balancing counterweight of the counterweight body by the factory.

In S2, docking a bottom of the central cylinder with the top of the pontoon and welding them on a ship, socketing the platform on an outer side of a top of central cylinder and welding the platform with the central cylinder, connecting a top of the arc-shaped steel mesh to a bottom of the pontoon, connecting the other end of each of the suspension bars at a corresponding position on the bottom of the pontoon, floating the pontoon on a water surface, and pouring concrete into an arc-shaped cavity through filling holes on a bottom plate of the pontoon to obtain the pontoon carrier component;

In S5, after installing the wind turbine, observing whether the pontoon carrier component is balanced, if not, placing the balancing counterweight at the bottom in the pontoon to ensure the pontoon carrier component is in balance in still water.

The present disclosure further provides an operation method of an offshore floating platform device. The method includes: when the pontoon carrier component is relatively stable, the buoyancy support component is in a non-operational state; when the pontoon carrier component is tilted to a set tilt value under an action of wind and waves, floating columns in the buoyancy support assemblies are immersed in water to generate buoyancy, which generates a supporting action on the pontoon carrier component, resists an overturning moment of the pontoon carrier component, and restores the pontoon carrier component to a balanced state.

Compared to existing technologies, the present disclosure has the following advantages:

In the present disclosure, by setting the buoyancy support component on the outer cylindrical surface of the central cylinder, the pontoon carrier component can automatically resist the impact of wind and waves and maintain a balanced state, preventing the platform at the top of the central cylinder from tilting and affecting personnel operations and ensuring the stability of wind power generation; by setting the anchor chain assembly on the outer cylindrical surface of the pontoon, the pontoon carrier component can maintain its elevation in the sea under various vertical loads and resist the rotational torque of the pontoon to avoid rotation; by setting the counterweight body at the bottom of the pontoon, the center of gravity of the pontoon carrier component is lowered and the stability of the pontoon carrier component is improved.

In the present disclosure, since the diameter of the pontoon is larger than the diameter of the central cylinder, the pontoon and the central cylinder form a structure with a larger diameter at the bottom and a smaller diameter at the top. The vertically arranged central cylinder serves as the column of the tower, providing support for the tower and transferring the load of the wind turbine to the pontoon. The central cylinder with a small diameter has a small volume when in contact with wind and waves, which can reduce the impact force of the wind and waves. Additionally, the cylindrical shape of the central cylinder with a curved windward surface can effectively reduce the wind and wave loads. Multiple horizontal partitions are provided sequentially from top to bottom inside the central cylinder, the arrangement of these horizontal partitions can enhance the strength and rigidity of the central cylinder.

In the present disclosure, since the central cylinder is located at the middle of the top surface of the pontoon and the axis of the arc-shaped counterweight coincides with the axis of the pontoon, the center of gravity of the pontoon carrier component is in the same vertical line as the center of buoyancy when the wind turbine is not installed. The setting of the arc-shaped counterweight can lower the center of gravity of the pontoon carrier component, thereby improving the stability during the process of towing the pontoon carrier component in water to the site water area.

In the present disclosure, the two pontoon boxes are arranged around the outer side of the central cylinder and are spliced to form a pontoon box body. The pontoon box body is located below the sea surface, and multiple columns are evenly distributed on the inner edge of the top surface of each pontoon box. Multiple columns are connected from top to bottom through horizontal arc beams to form a force transmission frame. Two force transmission frames are arranged around the outer side of the central cylinder and spliced to form a force transmission frame body. The inner side of the arc beam is provided with an arc-shaped slot having a conforming shape with the arc beam, and multiple rollers are provided in the arc-shaped slot. The rollers are in rolling contact with the outer cylindrical surface of the central cylinder. Multiple buoyancy support assemblies are arranged on the outer side of the arc beams at the top of the columns in the circumferential direction of the central cylinder. Each buoyancy support assembly includes an arc-shaped rod and a floating column, and a bottom of the floating column is higher than a static water level. In this way, the pontoon box body and the force transmission frame body, along with the rise and fall of the water level, roll up and down along the outer cylindrical surface of the central cylinder using the rollers based on the buoyancy of water, so that the floating columns are always above the static water level, that is, the elevations of the floating columns synchronously rise and fall with the water level elevation, realizing dynamic buoyancy support. Multiple buoyancy support assemblies uniformly distributed along the circumference of the central cylinder enable the pontoon carrier component to respond quickly to the instantaneous changes in wind and wave impact loads in different directions, resist wind loads and wave impact loads in different directions, and resolve any uneven vertical loads from the top surface of the platform to prevent tilting of the platform. The support buoyancy generated by the immersed floating columns is used to resist the overturning moment of the pontoon carrier component caused by wind and waves, making the swinging period of the pontoon carrier component short, thus effectively resisting wind and waves, and improving the stability of the wind turbine on the pontoon carrier component.

In the present disclosure, the anchor chain assembly includes multiple upper anchor chain components uniformly arranged around an upper end of the outer cylindrical surface of the pontoon and multiple lower anchor chain components uniformly arranged around a lower end of the outer cylindrical surface of the pontoon; where each of the upper anchor chain components includes an upper anchor chain inclined outward and downward; an upper end of the upper anchor chain is connected to a corresponding position on the upper end of the outer cylindrical surface of the pontoon, and a lower end of the upper anchor chain is connected to an upper mooring located on a seabed; where each of the lower anchor chain components includes a lower anchor chain inclined outward and downward; an upper end of the lower anchor chain is connected to a corresponding position on the lower end of the outer cylindrical surface of the pontoon, and a lower end of the lower anchor chain is connected to a lower mooring located on the seabed; the upper anchor chains and the lower anchor chains are arranged in a staggered manner. In this way, multiple upper anchor chain components and multiple lower anchor chain components constrain the pontoon in upper and lower layers, resisting the rotational torque of the pontoon carrier component and applying pre-tension to the pontoon to reduce the wind and wave loads on the pontoon carrier component, providing a stable environment for the wind turbine. The pre-tension applied to the pontoon ensures that the pontoon carrier component is always held in place by multiple upper anchor chains and multiple lower anchor chains, allowing it to stand semi-submerged in the water. The elevation of the top surface of the platform on the pontoon carrier component remains constant regardless of water level changes.

Figure 1:
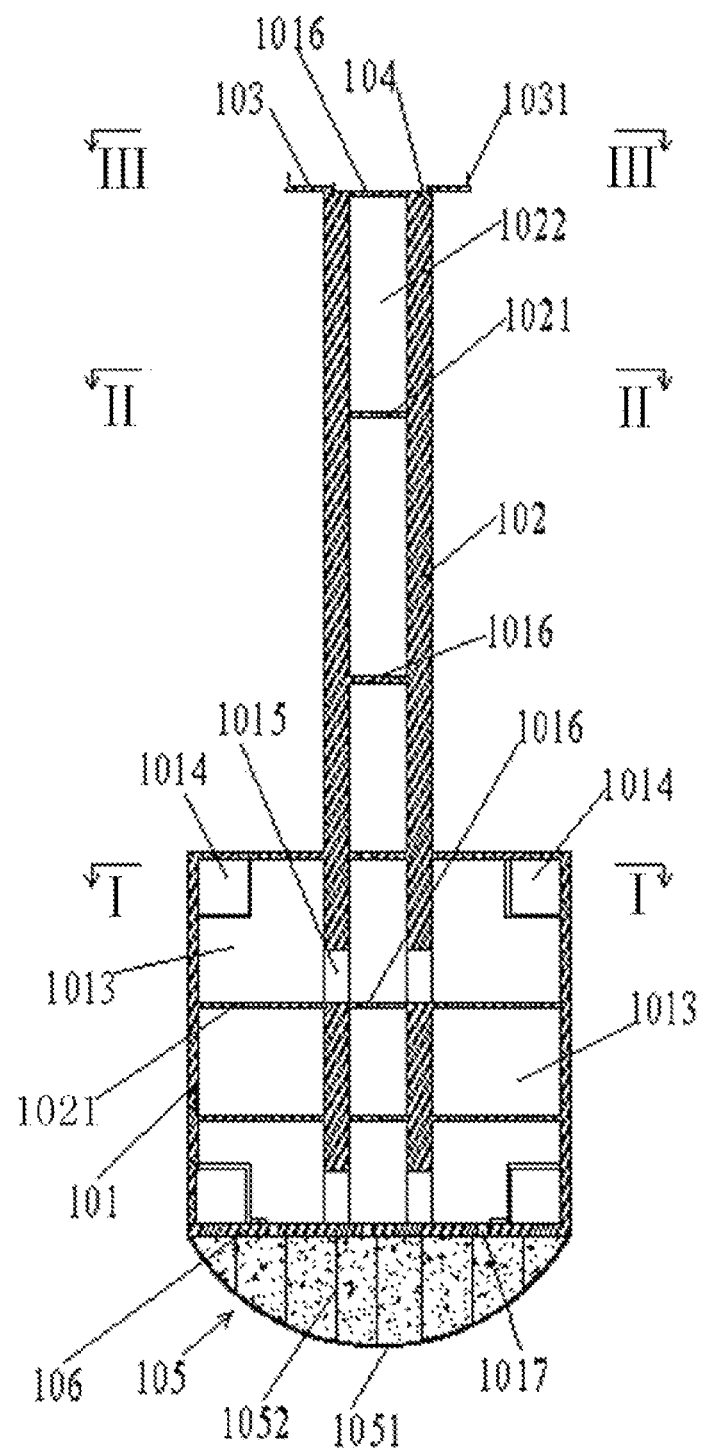
FIG. 1 is a schematic diagram of a front sectional view of a pontoon carrier component.

Reference Numbers: 101, Pontoon; 1011, Vertical partition; 1013, Pontoon chamber; 1014, Anchor chain chamber; 1015, Door opening; 1016, Access hole; 1017, Filling hole; 102, Central cylinder; 1021, Horizontal partition; 1022, Central cylinder chamber; 103, Platform; 1031, Railing; 104, Tower base; 105, Arc-shaped counterweight; 1051, Arc-shaped steel mesh; 1052, Suspension bar; 106, Balancing counterweight; 2, Wind turbine; 3, Tower; 401, Pontoon box; 4011, Pontoon box connecting plate; 402, Force transmission frame; 4021, Column; 4022, Arc beam; 4023, Frame connecting plate; 4031, Arc-shaped slot; 4032, Roller; 4041, Arc-shaped rod; 4042, Floating column; 501, Upper anchor chain; 502, Upper mooring; 503, Lower anchor chain; 504, Lower mooring; A, Dominant wind direction; B, Lowest water level; C, Highest water level; D, Still water level; E, Waves concentrated at a surface of water; F, Combined force of wind and wave loads; $F_f$, Buoyancy generated by floating columns immersed in water.

DETAILED DESCRIPTION

FIGS. 1-5 and 13-14 show an offshore floating platform device. The offshore floating platform device includes a pontoon carrier component. The pontoon carrier component includes a pontoon 101, and the pontoon 101 is provided with a counterweight body at a bottom and a central cylinder 102 at a top. An anchor chain assembly is provided on an outer cylindrical surface of the pontoon 101 for keeping the elevation of the pontoon carrier component in the sea. A circular platform 103 is provided around an edge of a top surface of the central cylinder 102, and an axis of the central cylinder 102 coincides with that of the platform 103. Railings 1031 are provided around the edge of the platform 103. The platform 103 is mainly used as an installation and maintenance site for a wind turbine 2. Multiple tower bases 104 are provided on the top surface of the central cylinder 102 for installing a tower 3 of the wind turbine 2. A buoyancy support component is provided on an outer cylindrical surface of the central cylinder 102, and the buoyancy support component ascends and descends as it rolls along the outer cylindrical surface of the central cylinder 102 in response to changes in water level. The pontoon 101, the central cylinder 102, and the platform 103 are made of the same material. By setting the buoyancy support component on the outer cylindrical surface of the central cylinder 102, the pontoon carrier component can automatically resist the impact of wind and waves and maintain a balanced state, preventing the platform 103 at the top of the central cylinder 102 from tilting and affecting personnel operations and ensuring the stability of wind power generation. By setting the anchor chain assembly on the outer cylindrical surface of the pontoon 101, the pontoon carrier component can maintain its elevation in the sea under various vertical loads and resist the rotational torque of the pontoon 101 to avoid rotation. By setting the counterweight body at the bottom of the pontoon 101, the center of gravity of the pontoon carrier component is lowered and the stability of the pontoon carrier component is improved.

Figure 2:
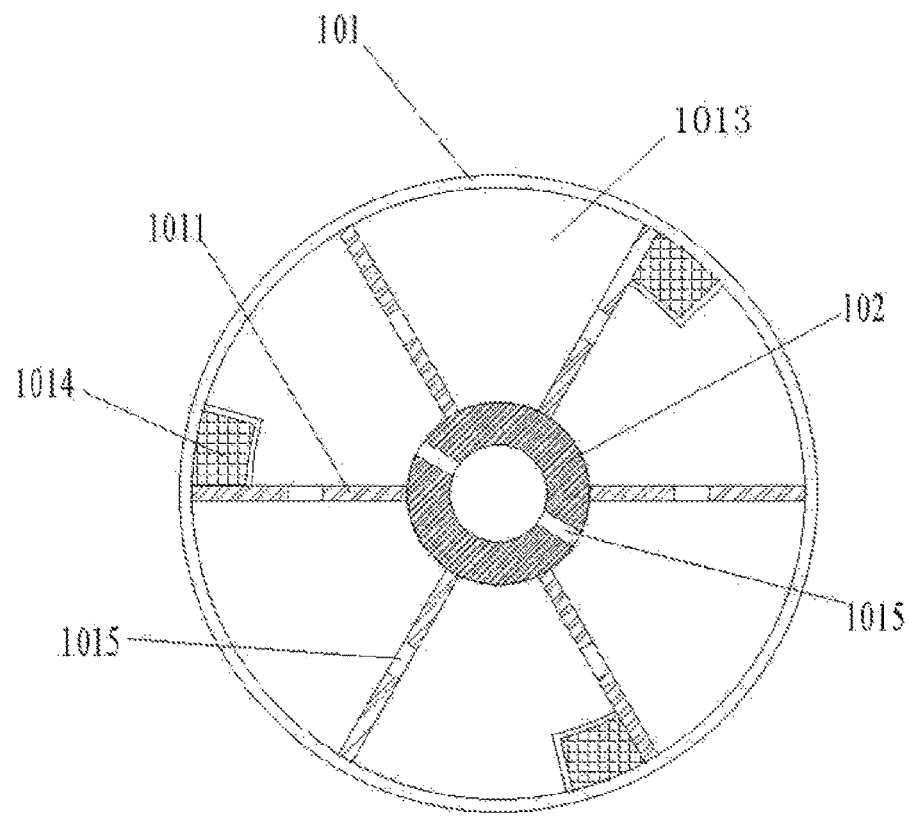
FIG. 2 is a schematic diagram of a cross-sectional structure in the I-I direction of FIG. 1.
Figure 3:
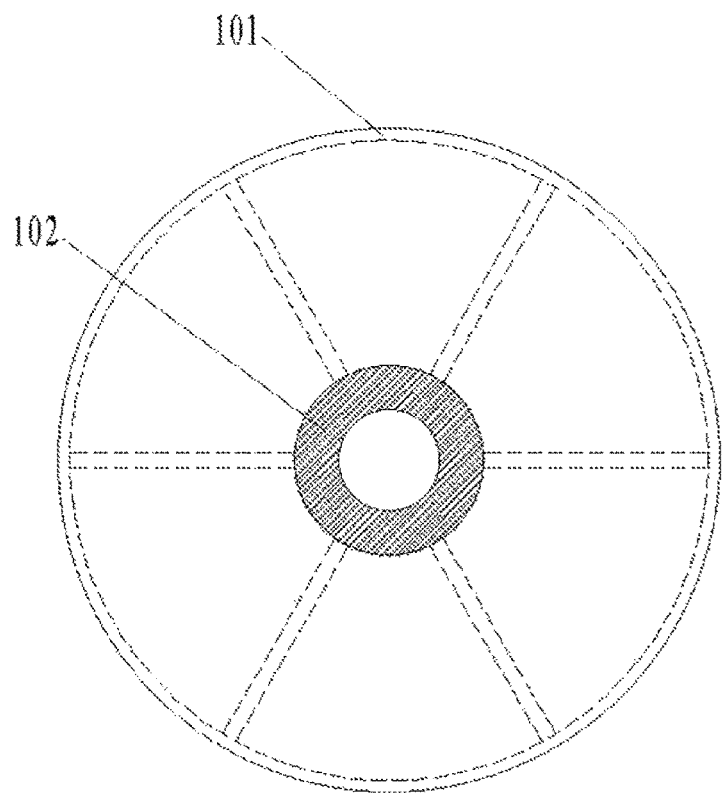
FIG. 3 is a schematic diagram of a cross-section structure in the II-II direction of FIG. 1.
Figure 4:
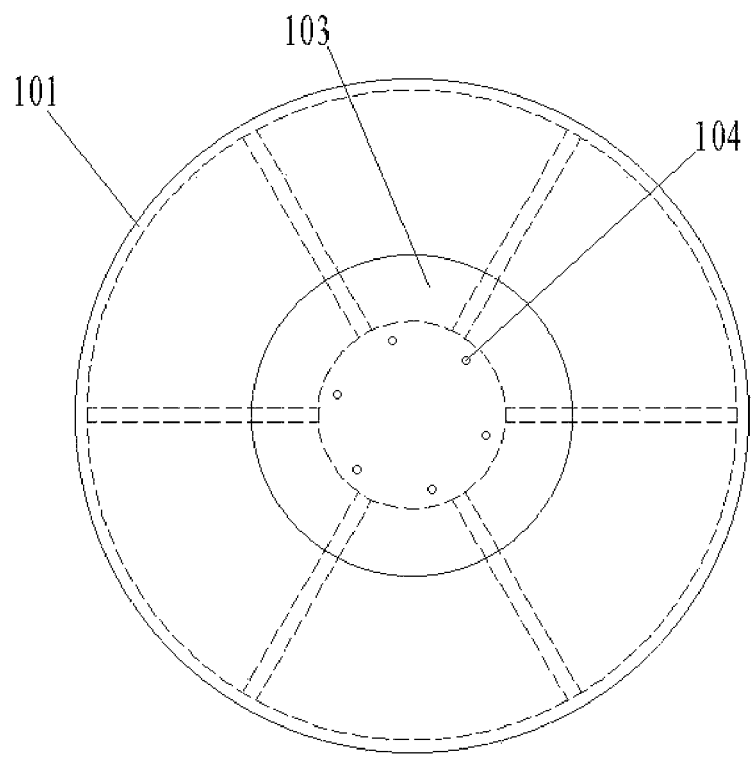
FIG. 4 is a schematic diagram of a cross-section structure in the III-III direction of FIG. 1.
Figure 5:
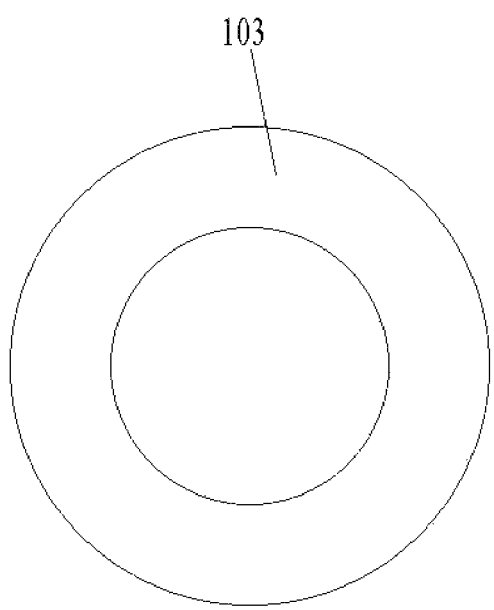
FIG. 5 is a schematic top view of a platform in FIG. 1.

In an embodiment, as shown in FIGS. 1 and 2, the diameter of the pontoon 101 is larger than the diameter of the central cylinder 102. The central cylinder 102 is disposed in the middle of the top surface of the pontoon 101, and the bottom of the central cylinder 102 is inserted in the pontoon 101, with the bottom end of the central cylinder 102 located on the inner bottom surface of the pontoon 101. The tower bases 104 are circularly distributed on the top surface of the central cylinder 102, and the tower 3 is mounted on the tower bases 104. The axis of the tower 3 coincides with the axis of the central cylinder 102. The diameter of the central cylinder 102 is determined by the diameter of the tower 3. Multiple vertical partitions 1011 are evenly distributed around a circumference of the pontoon 101. The vertical partitions 1011 are connected through multiple horizontal partitions 1021 from top to bottom, forming multiple pontoon chambers 1013. Each of the vertical partitions 1011 is provided with a door opening 1015, and each of the horizontal partitions 1021 is provided with an access hole 1016, therefore, the pontoon chambers 1013 are intercommunicated. The setting of the vertical partitions 1011 and horizontal partitions 1021 enhances the strength and rigidity of the pontoon 101. The material of the pontoon 101 is steel or high-strength plastic steel. Additionally, when the diameter of the pontoon 101 is large, it is inconvenient to transport the entire pontoon 101 on land. The pontoon 101 can be prefabricated in sections (two or four equal sections) at the factory, and then these sections can be transported to the coast and assembled by on-site welding to obtain the pontoon 101. Multiple horizontal partitions 1021 are sequentially arranged from top to bottom in the central cylinder 102, forming multiple central cylinder chambers 1022. Each of the horizontal partitions 1021 in the central cylinder 102 is provided with an access hole 1016, and door openings 1015 are provided at the lower part of the side wall of the central cylinder 102, therefore, the central cylinder chambers 1022 are intercommunicated, and the pontoon chambers 1013 and the central cylinder chambers 1022 are intercommunicated. A ladder is provided on the inner wall of the central cylinder 102, with the bottom of the ladder reaching to the bottom of the pontoon 101. The setting of the horizontal partitions 1021 can enhance the strength and rigidity of the central cylinder 102. In addition, the tower 3 is a hollow cylinder with a door opening 1015 on its side wall for access to its interior space. Access to the interior space of the central cylinder 102 is made through the access hole 1016 of the central cylinder 102, followed by access to the interior space of the pontoon 101. Part of the pontoon chambers 1013 are provided with anchor chain chambers 1014 and anchor machines for installing the anchor chain assembly. Furthermore, when the platform 103 is large in size, it can be symmetrically divided into two pieces, which are welded after docking, and then the platform 103 is socketed and welded to the central cylinder 102. Both the platform 103 and the central cylinder 102 exhibit curved exteriors, which can reduce the resistance experienced by the platform 103 during the movement of the sea waves to minimize the wind loads and impact loads, thereby minimizing the effects of wind loads and wave loads on the platform 103.

As shown in FIG. 1, the counterweight body includes an arc-shaped counterweight 105 and a balancing counterweight 106. The axis of the arc-shaped counterweight 105 coincides with the axis of the pontoon 101. The arc-shaped counterweight 105 includes an arc-shaped steel mesh 1051, the top of which is provided with an opening, and a diameter of the opening is equal to the diameter of the pontoon 101. The top of the arc-shaped steel mesh 1051 is connected to the bottom of the pontoon 101. The inner surface of the arc-shaped steel mesh 1051 is bonded with geotextile and forms an arc-shaped cavity, in which multiple suspension bars 1052 are installed. One end of each of the suspension bars 1052 is connected to the arc-shaped steel mesh 1051, and the other end is connected to the bottom of the pontoon 101. Multiple filling holes 1017 are provided on the bottom plate of the pontoon 101 for pouring concrete into the arc-shaped cavity. The vertical height of the arc-shaped counterweight 105 is determined according to the counterweight requirements. The balancing counterweight 106 consists of multiple concrete-prefabricated blocks and is placed at the bottom within the pontoon 101 for adjusting the balance of the pontoon carrier component after installation of the wind turbine 2.

Figure 17:
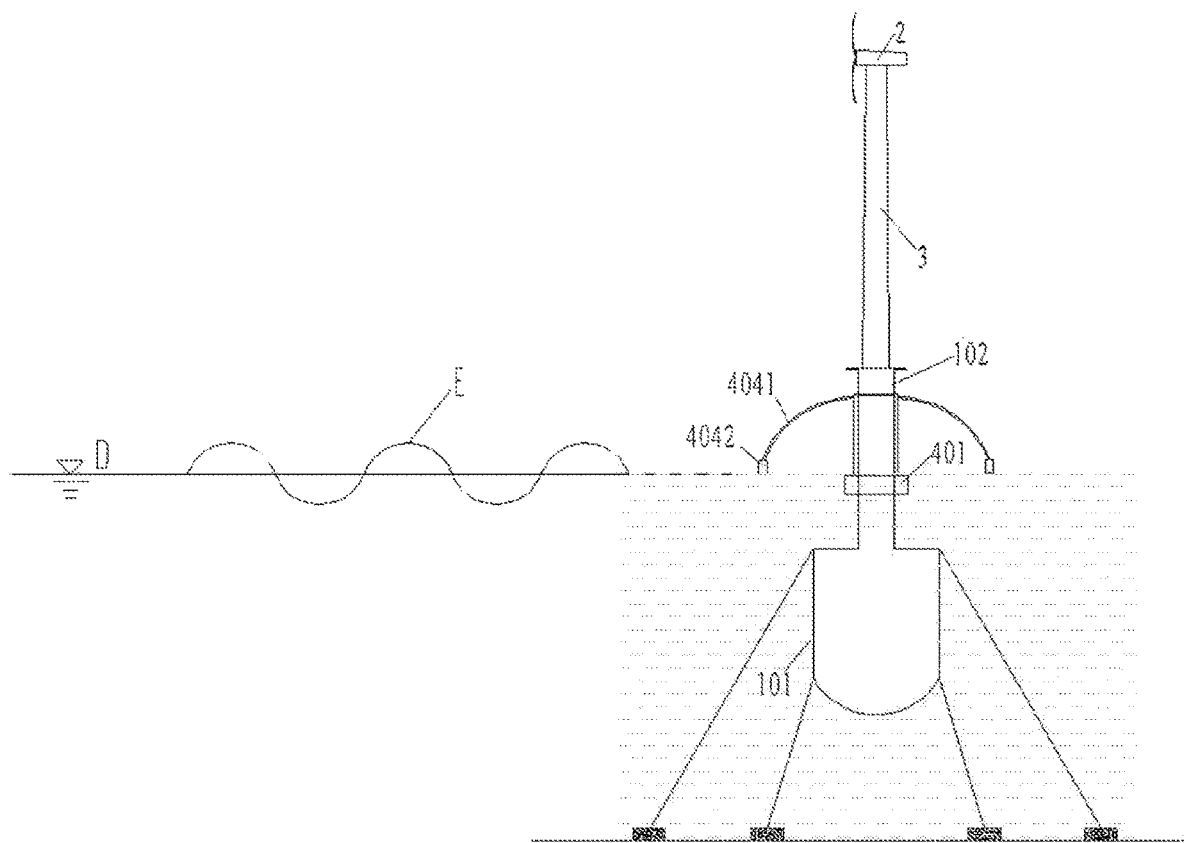
FIG. 17 is a schematic diagram of an offshore floating platform device installed with a wind turbine when it suffers from waves.

Since the diameter of the pontoon 101 is larger than the diameter of the central cylinder 102, the pontoon 101 and the central cylinder 102 form a structure with a larger diameter at the bottom and a smaller diameter at the top. The large-diameter pontoon 101 mainly provides buoyancy and serves as a support structure. The size of the pontoon 101 is determined by the calculation of the required buoyancy, usually based on the lowest water level. The buoyancy generated by the buoyancy support component is used to resist wave, wind loads, or unbalanced loads. The buoyancy support component is an independent floating component, and the buoyancy of the buoyancy support component is not included in the buoyancy of the pontoon carrier component. Additionally, the top surface of the large-diameter pontoon 101 is subjected to ballast water loads, resulting in more uniform stress on the pontoon 101. The vertically arranged central cylinder 102 serves as the column of the tower 3, providing support for the tower 3 and transferring the load of the wind turbine 2 to the pontoon 101. The central cylinder 102 is the main component subjected to wave energy, and the smaller the diameter of the central cylinder 102, the smaller its volume in contact with wind and waves, reducing the impact of wave energy. Therefore, the small diameter of the center cylinder 102 can reduce the impact of the wind and waves. In FIG. 17, D represents the static water level, and E represents the waves concentrated at the surface of the water. The central cylinder 102 is cylindrical in shape, with a curved windward surface, effectively reducing wind and wave loads. Furthermore, the small diameter of the central cylinder 102 reduces the amount of steel used and its self-weight.

Since the central cylinder 102 is located at the middle of the top surface of the pontoon 101 and the axis of the arc-shaped counterweight 105 coincides with the axis of the pontoon 101, the center of gravity of the pontoon carrier component is in the same vertical line as the center of buoyancy when the wind turbine 2 is not installed. The setting of the arc-shaped counterweight 105 can lower the center of gravity of the pontoon carrier component, thereby improving the stability during the process of towing the pontoon carrier component in water to the site water area.

Figure 8:
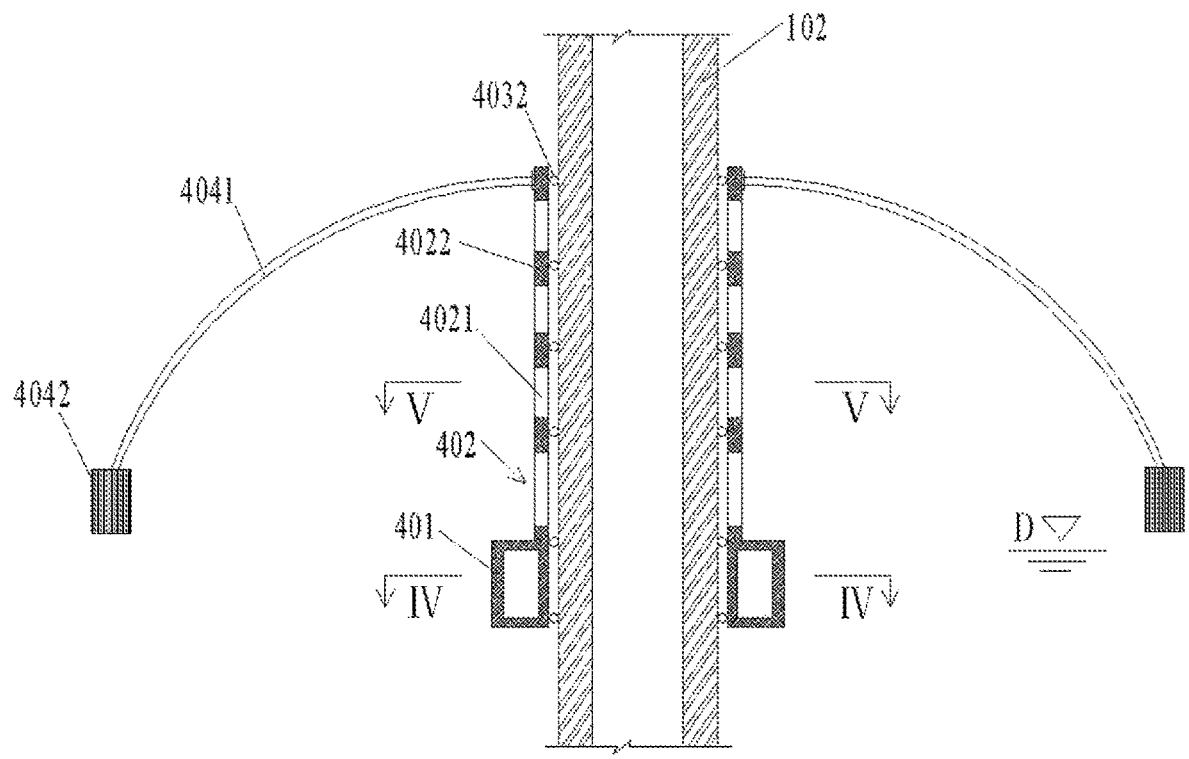
FIG. 8 is a schematic front sectional view of a buoyancy support component arranged on an outer cylindrical surface of a central cylinder.
Figure 9:
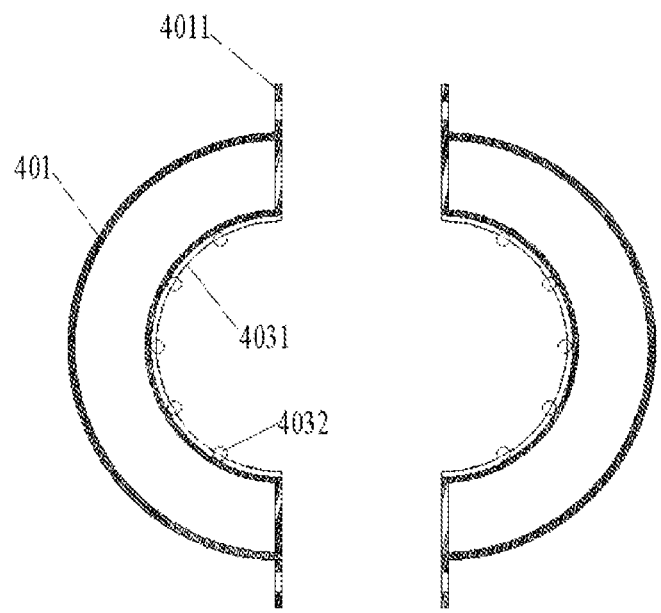
FIG. 9 is a schematic diagram of a sectional structure of two pontoon boxes along the IV-IV direction in FIG. 8.
Figure 10:
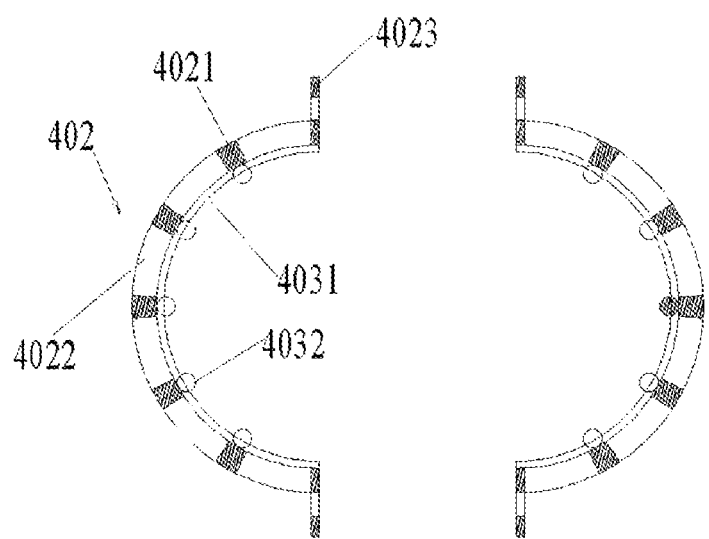
FIG. 10 is a schematic diagram of a sectional structure of two force transmission frames along the V-V direction in FIG. 8.

In an embodiment, as shown in FIGS. 8-10, the buoyancy support component includes two symmetrical semi-circular ring-shaped pontoon boxes 401. The two pontoon boxes 401 are arranged around the outer side of the central cylinder 102 and can be spliced to form a pontoon box body. The pontoon box body is located below the sea surface, and multiple columns 4021 are evenly distributed on the inner edge of the top surface of each pontoon box 401. Multiple columns 4021 distributed on each pontoon box are connected from top to bottom through horizontal arc beams 4022 to form a force transmission frame 402. Two force transmission frames 402 are arranged around the outer side of the central cylinder 102 and can be spliced to form a force transmission frame body. The inner side of the arc beam 4022 is provided with a stainless steel arc-shaped slot 4031 having a conforming shape with the arc beam 4022, and multiple rollers 4032 are provided in the arc-shaped slot 4031. The rollers 4032 are in rolling contact with the outer cylindrical surface of the central cylinder 102. In addition, an arc-shaped slot 4031 with rollers 4032 is also provided at the lower end inside the pontoon box 401. Multiple buoyancy support assemblies are arranged on the outer side of the arc beams 4022 at the top of the columns 4021 in the circumferential direction of the central cylinder 102.

Figure 6:
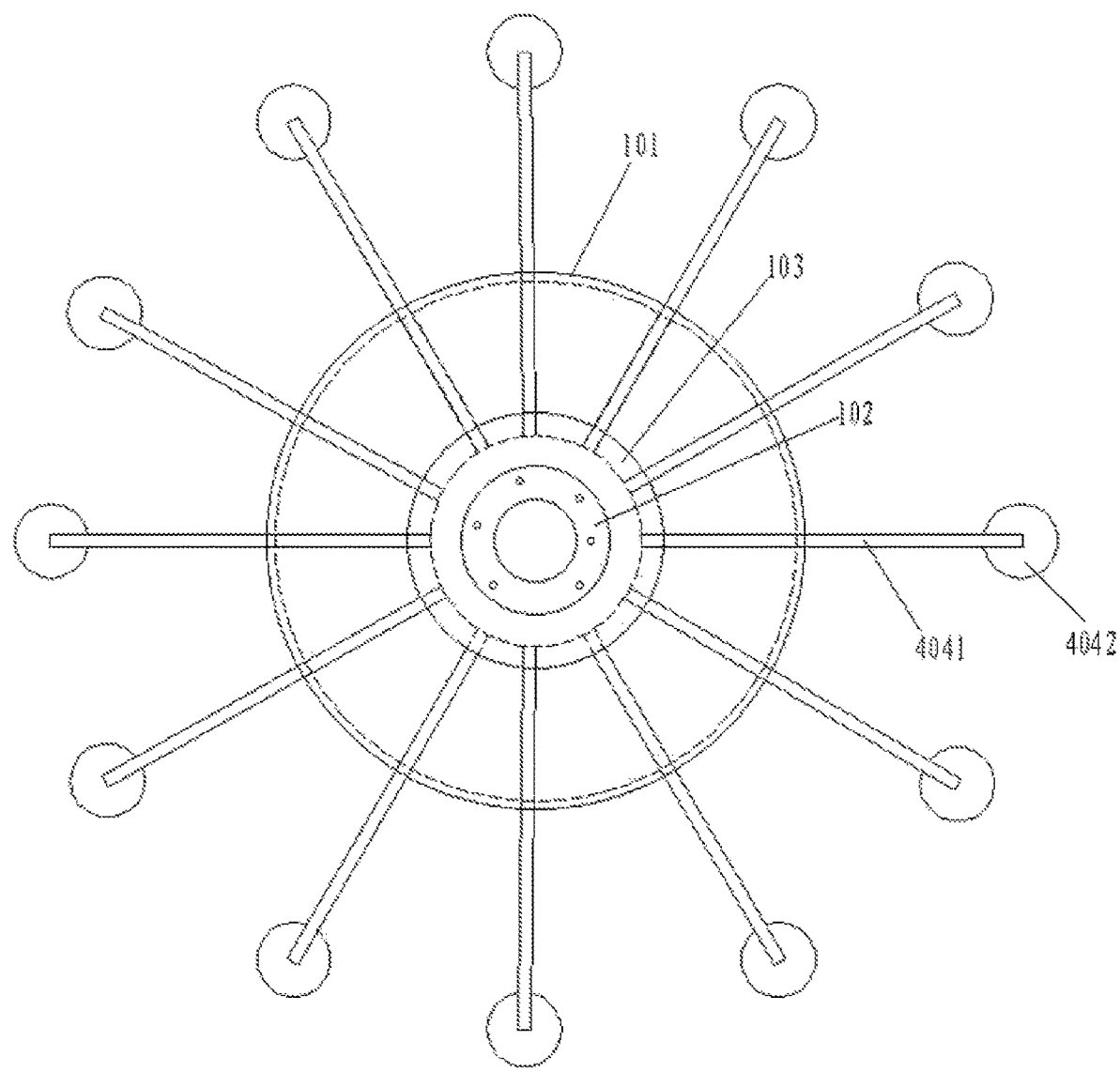
FIG. 6 is a schematic top view of multiple buoyancy support assemblies uniformly distributed along the circumferential of a central cylinder.

As shown in FIGS. 6 and 8, the buoyancy support assemblies are uniformly distributed along the circumference of the central cylinder 102. Each of the buoyancy support assemblies includes an arc-shaped rod 4041 with the concave side facing downwards. The arc-shaped rod 4041 is a steel tube, with its top connected to a corresponding position on the outer side of the arc beams 4022 and its bottom provided with a hollow floating column 4042. The material of the floating column 4042 is steel, and the bottom of the floating column 4042 is higher than the static water level, generally about 50 mm higher than the static water level. The vertical distance between the bottom of the floating column 4042 and the static water level is determined by the inclination of the tower 3 of the wind turbine 2. In FIG. 8, D represents the still water level, i.e., the still water level at any elevation. The arc-shaped rod 4041 is an arc component, and the buoyancy generated by the floating column 4042 is transmitted axially to the arc-shaped rod 4041, and then axially to the force transmission frame 402 and the central cylinder 102, providing lateral support to the central cylinder 102. The bottom end of the arc-shaped rod 4041 can also be provided with a hollow floating ball. In addition, the horizontal length of the arc-shaped rod 4041 is proportional to the resistance moment against overturning. The size of the floating column 4042 is determined by the buoyancy required to resist tilting, and the buoyancy of the floating column 4042 is proportional to the resistance moment against overturning. At the lowest water level, the support point to the pontoon carrier component provided by the floating column 4042 is at the lower part of the central cylinder 102, leading to the smallest moment arm, therefore the maximum buoyancy of the floating column 4042 is required to overcome the same inclination of the pontoon carrier component, and the size of the floating column 4042 is calculated accordingly.

Figure 7:
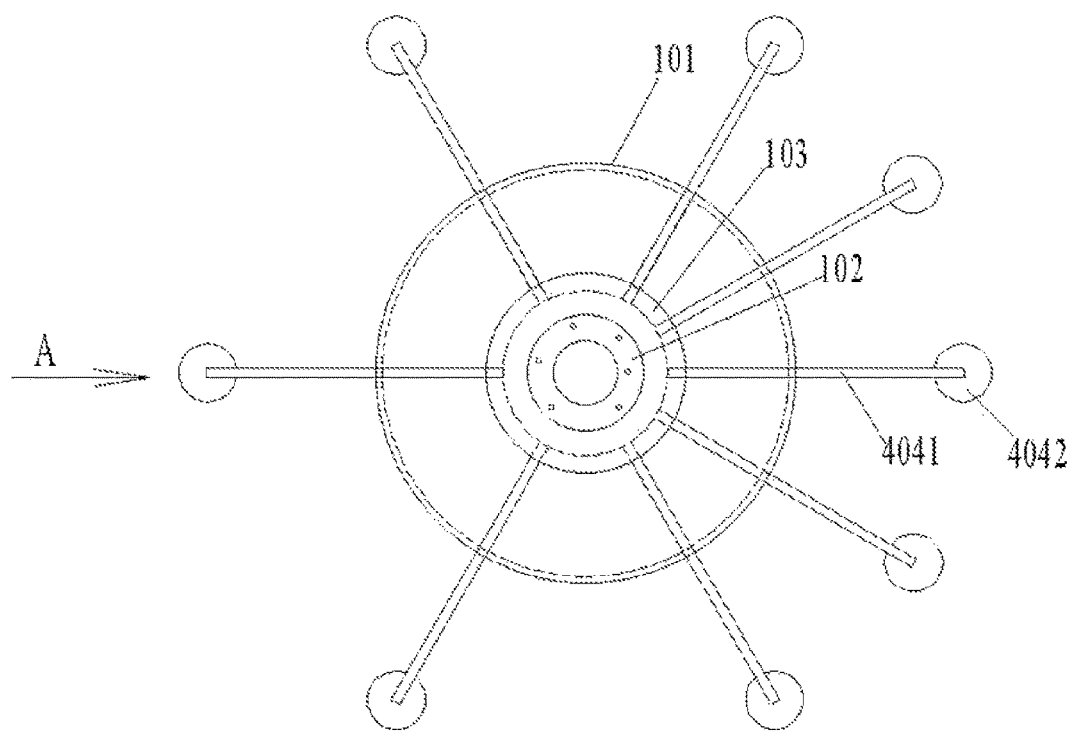
FIG. 7 is a schematic top view of multiple buoyancy support assemblies unevenly distributed along the circumferential of a central cylinder.

When the dominant wind direction in the water area is clear, the buoyancy support assemblies can also be unevenly distributed along the circumference of the central cylinder 102, that is, more buoyancy support assemblies are arranged on the leeward side of the central cylinder 102 to resist larger and more waves, as shown in FIG. 7. In FIG. 7, A represents the dominant wind direction.

The pontoon box body provides buoyancy to support vertical movements of the buoyancy support assemblies along the central cylinder 102. The required buoyancy is calculated based on the gravities of the arc-shaped rods 4041, the floating columns 4042, and the force transmission frames 402 as well as the rolling friction force of the rollers 4032. The size of the pontoon box 401 is determined according to the required buoyancy.

The pontoon box body and the force transmission frame body, along with the rise and fall of the water level, roll up and down along the outer cylindrical surface of the central cylinder 102 using the rollers 4032 based on the buoyancy of water, so that the floating columns 4042 are always above the static water level, that is, the elevations of the floating columns 4042 synchronously rise and fall with the elevation of the water, realizing dynamic buoyancy support. Multiple buoyancy support assemblies uniformly distributed along the circumference of the central cylinder 102 enable the pontoon carrier component to respond quickly to the instantaneous changes of wind and wave impact loads in different directions, resist wind loads and wave impact loads in different directions, and resolve any uneven vertical loads on the top surface of the platform 103 to prevent tilting of the platform 103. The support buoyancy generated by the immersed floating columns 4042 is used to resist the overturning moment of the pontoon carrier component caused by wind and waves, making the swinging period of the pontoon carrier component shorter, thus effectively resisting wind and waves, and improving the stability of the wind turbine 2 on the pontoon carrier component. The structure of the buoyancy support component is simple, with strong controllability and operability, and is easy to install and maintain.

Figure 15:
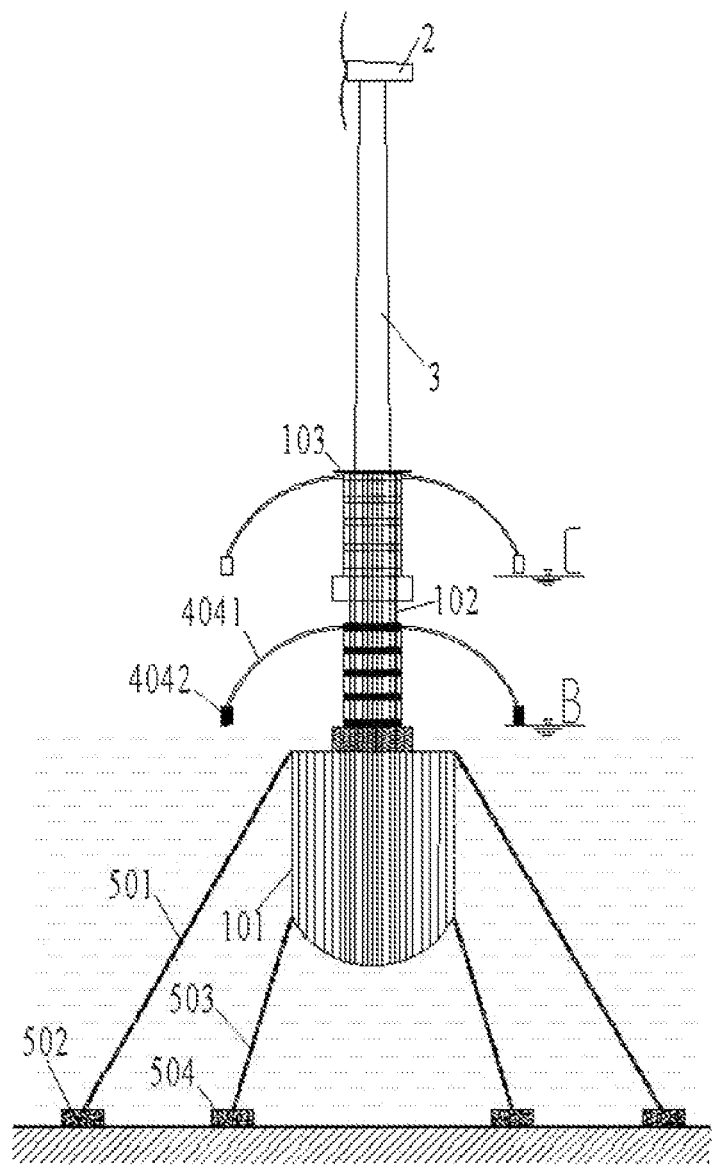
FIG. 15 is a schematic front view of an offshore floating platform device installed with a wind turbine when it is at the lowest and highest water levels.

As the central cylinder 102 serves as the support for the buoyancy support component, the buoyancy support component moves up and down along the outer cylindrical surface of the central cylinder 102 as the water level rises and falls, thereby maintaining a constant draft of the pontoon box body. This design is suitable for water areas of various depths, making it widely applicable. Refer to FIG. 15, B represents the lowest water level and C represents the highest water level. Since the buoyancy support component can move up and down along the outer cylindrical surface of the central cylinder 102 as the water level changes, the height of the central cylinder 102 needs to accommodate the displacement of the buoyancy support component. The height of the central cylinder 102 can be determined as follows: the height of the central cylinder 102 equals the highest water level minus the lowest water level plus the vertical height of the arc-shaped rod 4041. Additionally, since waves are formed on the water surface, when the height of the central cylinder 102 is equal to the height of the waves, the impact of the waves on the central cylinder 102 is minimized. Therefore, the height of the central cylinder 102 can also be determined based on the designed wave height of the water area. In summary, after comparing the values of "the highest water level minus the lowest water level plus the vertical height of the arc-shape rod 4041" and "the designed wave height of the water area," and the larger value is selected to serve as the height of the central cylinder 102.

In addition, since the two pontoon boxes 401 are arranged around the outer side of central cylinder 102 and can be spliced to form the pontoon box body, and the two force transmission frames 402 are arranged around the outer side of central cylinder 102 and can be spliced to form the force transmission frame body, a small-diameter center cylinder 102 allows for smaller inner diameters of the pontoon boxes 401 and allows for smaller diameters of the force transmission frames 402.

Preferably, as shown in FIG. 9, both ends of each pontoon box 401 are provided with vertical and outward-extending pontoon box connecting plates 4011, and the pontoon box connecting plates 4011 at the corresponding ends of the two pontoon boxes 401 are connected by bolts. As shown in FIG. 10, the columns 4021 at both ends of each force transmission frame 402 are provided with vertical and outward-extending frame connecting plates 4023. The frame connecting plates 4023 at the corresponding ends of the two force transmission frames 402 are connected by bolts.

Figure 11:
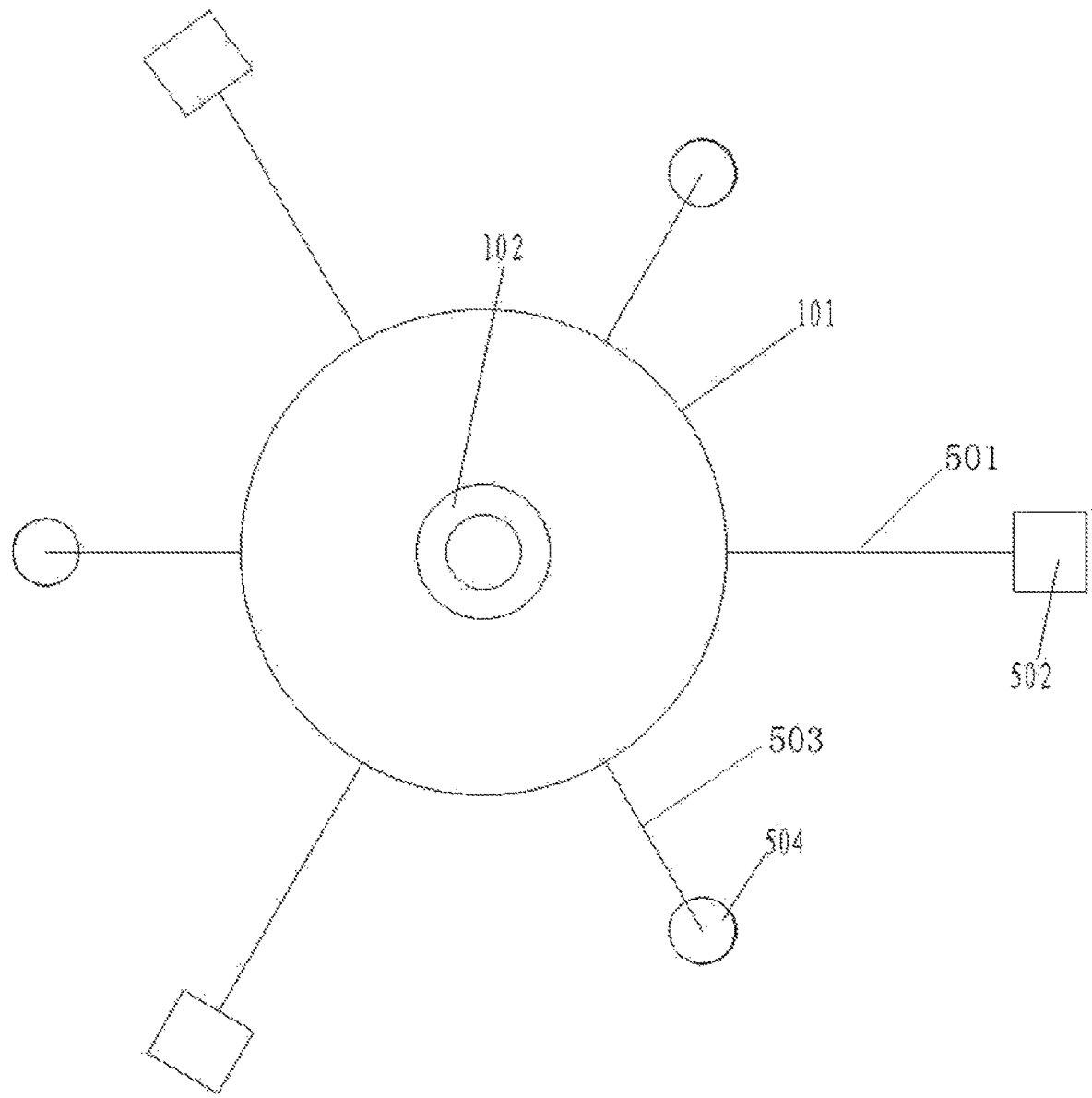
FIG. 11 is a schematic top view of an anchor chain assembly arranged on an outer cylindrical surface of a pontoon.
Figure 12:
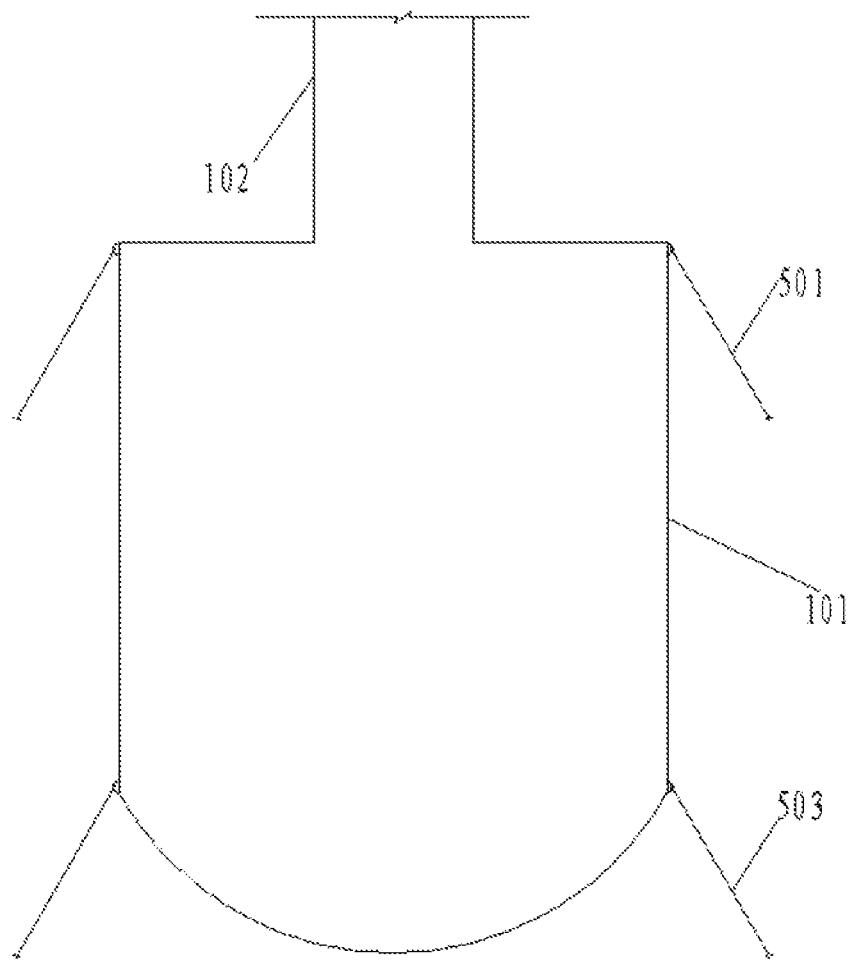
FIG. 12 is a schematic front view of an anchor chain assembly arranged on an outer cylindrical surface of a pontoon.
Figure 13:
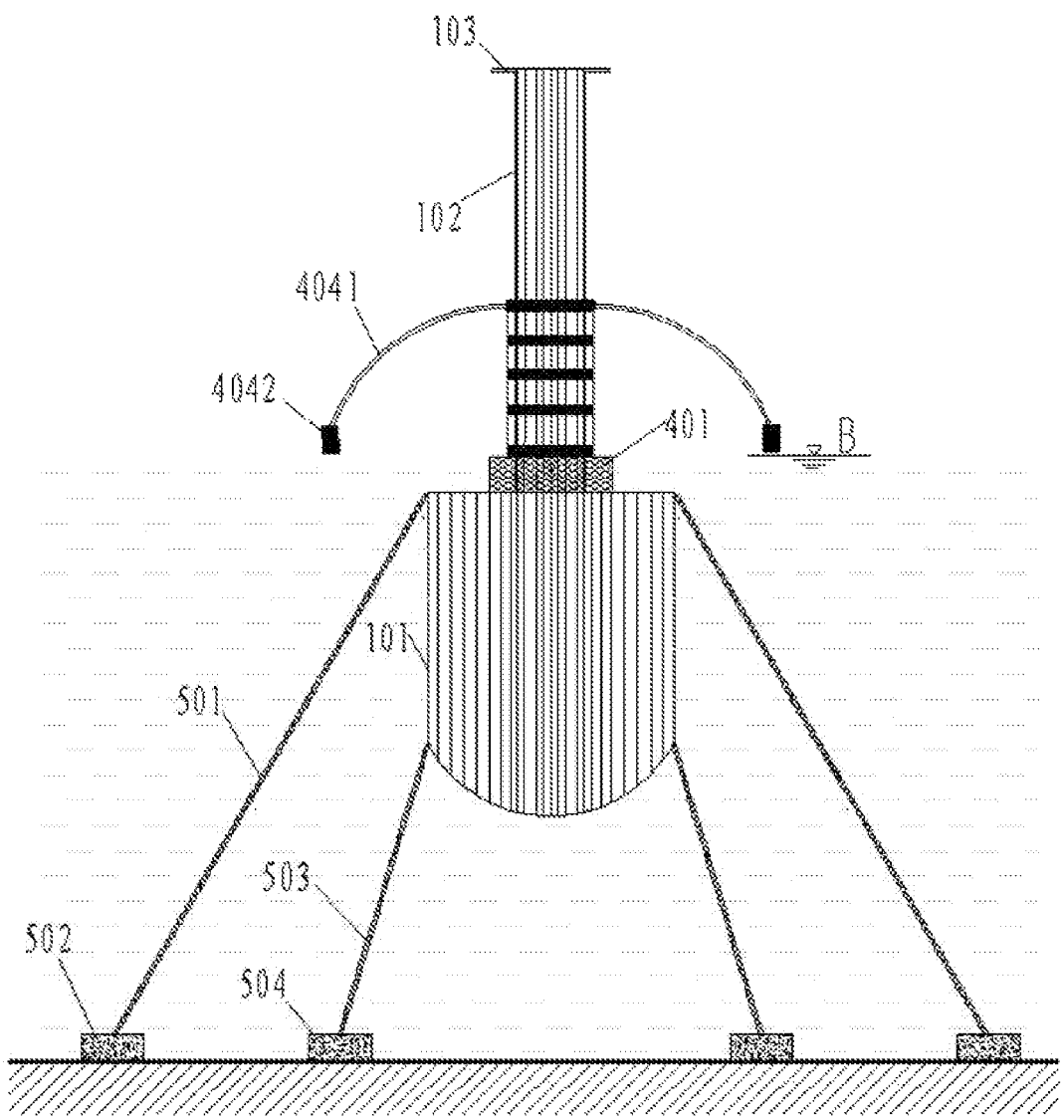
FIG. 13 is schematic front view of an offshore floating platform device.
Figure 14:
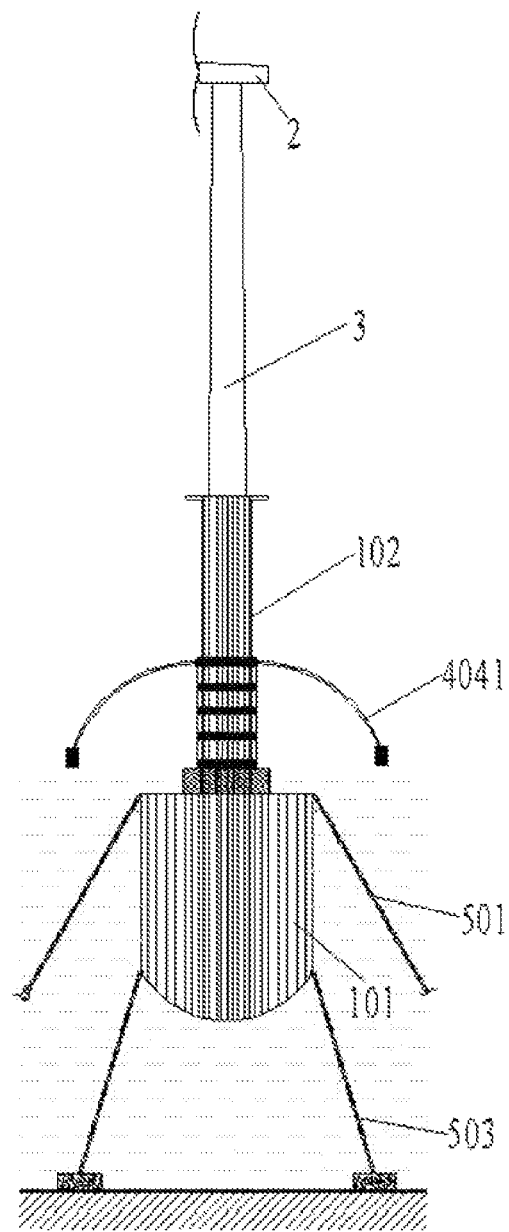
FIG. 14 is a schematic front view of an offshore floating platform installed with a wind turbine.

In an embodiment, as shown in FIGS. 11-13, the anchor chain assembly includes multiple upper anchor chain components uniformly arranged around the upper end of the outer cylindrical surface of the pontoon 101 and multiple lower anchor chain components uniformly arranged around the lower end of the outer cylindrical surface of the pontoon 101. Each of the upper anchor chain components includes an upper anchor chain 501 inclined outward and downward. The upper end of the upper anchor chain 501 is connected to a corresponding position on the upper end of the outer cylindrical surface of the pontoon 101, and the lower end is connected to an upper mooring 502 located on the seabed. Each of the lower anchor chain components includes a lower anchor chain 503 inclined outward and downward. The upper end of the lower anchor chain 503 is connected to a corresponding position on the lower end of the outer cylindrical surface of the pontoon 101, and the lower end is connected to a lower mooring 504 located on the seabed. The upper anchor chains 501 and the lower anchor chains 503 are arranged in a staggered manner. The inclined upper anchor chains 501 and lower anchor chains 503 can provide both vertical and horizontal constraints to the pontoon 101. The anchor machine in the pontoon chambers 1013 can adjust the length of the upper anchor chains 501 or the lower anchor chains 503. Preferably, three upper anchor chains 501 and three lower anchor chains 503 are provided, the upper ends of the three upper anchor chains 501 enclosing an equilateral triangle, and the upper ends of the three lower anchor chains 503 enclosing an equilateral triangle, to ensure the stability of the pontoon carrier component.

The lengths of the upper anchor chains 501 and the lower anchor chains 503 are set according to the lowest water level. At the lowest water level, the buoyancy of the pontoon carrier component is minimal, so the tension applied to the pontoon 101 by the upper anchor chains 501 and the lower anchor chains 503 is minimal. As the water level rises, the buoyancy of the pontoon carrier component gradually increases, and the tension applied to the pontoon 101 by the upper anchor chains 501 and the lower anchor chains 503 gradually increases. In any situation, the buoyancy of the pontoon carrier component is greater than the gravity, and the pontoon carrier component is in a constrained state, that is, it is subjected to the tension of the upper anchor chains 501 and the lower anchor chains 503. Furthermore, at the highest water level, the maximum buoyancy of the pontoon carrier component is calculated to determine the maximum tension of the upper anchor chains 501 and lower anchor chains 503, and to determine the anchoring force of the upper moorings 502 and lower moorings 504.

Multiple upper anchor chain components and multiple lower anchor chain components constrain the pontoon 101 from multiple angles in upper and lower layers, resisting the rotational torque of the pontoon carrier component, applying pre-tension to the pontoon 101 to reduce the wind and wave loads experienced by the pontoon carrier component, and providing a stable environment for the wind turbine 2. The pre-tension applied to the pontoon 101 ensures that the pontoon carrier component is always held in place by multiple upper anchor chains 501 and multiple lower anchor chains 503, allowing it to be semi-submerged in the water. The elevation of the top surface of the platform 103 on the pontoon carrier component remains constant regardless of water level changes, reducing the swaying motion of the pontoon carrier component. In addition, the curved surface of the arc-shaped counterweight 105 helps to partially counteract the vertical ocean current effects, and the combined action of the anchor chain component and the arc-shaped counterweight 105 brings the swaying motion of the pontoon carrier component close to zero under certain wave frequencies, thereby inhibiting the motion of the pontoon carrier component responding to the waves to a certain extent, and significantly improving the stability and safety of the pontoon carrier component.

Figure 16:
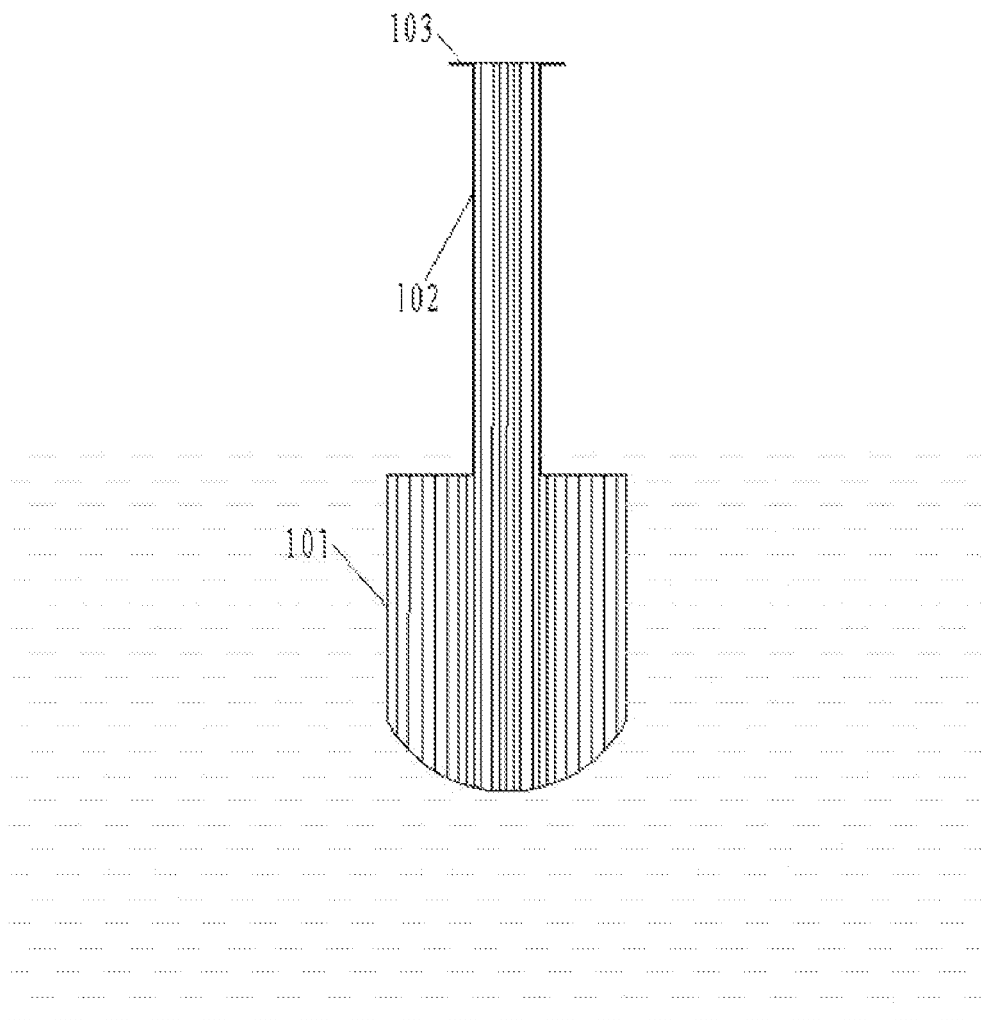
FIG. 16 is a schematic front view of a pontoon carrier component when towed in water.

The present disclosure further provides a method for constructing an offshore floating platform device. The method includes:

S1, producing a pontoon 101, a central cylinder 102, and a platform 103 by a factory according to design dimensions; further producing an arc-shaped steel mesh 1051, multiple suspension bars 1052, and a balancing counterweight 106; bonding geotextile on an inner surface of the arc-shaped steel mesh 1051, and connecting one end of each suspension bar 1052 to the arc-shaped steel mesh 1051; producing two pontoon boxes 401, two force transmission frames 402, multiple arc-shaped slots 4031, multiple rollers 4032, multiple arc-shaped rods 4041, and multiple floating columns 4042 by a factory according to design dimensions; producing multiple upper moorings 502, multiple upper anchor chains 501, multiple lower moorings 504, and multiple lower anchor chains 503 by a factory according to design dimensions;

S2, docking a bottom of the central cylinder 102 with a top of the pontoon 101 and welding them on the ship, socketing the platform 103 on an outer side of a top of the central cylinder 102 and welding the platform 103 with the central cylinder 102, connecting a top of the arc-shaped steel mesh 1051 to a bottom of the pontoon 101, connecting the other end of each suspension bar 1052 to a corresponding position on the bottom of the pontoon 101, floating the pontoon 101 on a water surface, and pouring concrete into an arc-shaped cavity through filling holes 1017 on a bottom plate of the pontoon 101 to obtain a pontoon carrier component; after pouring the concrete, sealing the filling holes 1017, and towing the pontoon carrier component to a site water area, as shown in FIG. 16;

S3, installing the rollers 4032 into the arc-shaped slots 4031, welding the arc-shaped slots 4031 to corresponding arc beams 4022, and connecting the floating columns 4042 to bottoms of corresponding arc-shaped rods 4041; upon transporting the pontoon carrier component to the site water area, since a wind turbine 2 has not been installed yet, the pontoon carrier component is in a floating state with shallow draft, at this time, installing a buoyancy support component on a top surface of the pontoon 101, that is, the two pontoon boxes 401 are arranged around an outer side of the central cylinder 102, connecting pontoon box connecting plates 4011 at corresponding ends of the two pontoon boxes 401 by bolts, arranging the two force transmission frames 402 around the outer side of the central cylinder 102, connecting the frame connecting plates 4023 at corresponding ends of the two force transmission frames 402 by bolts, where columns 4021 on each force transmission frame 402 are connected at corresponding positions on an inner edge of a top surface of the pontoon box 401 in a corresponding side, and connecting tops of the arc-shaped rods 4041 to corresponding positions on an outer side of the arc beams 4022 at a top of the columns 4021;

S4, when the water level in the on-site water area reaches the lowest level, loading sandbags on the top of platform 103 to enable the elevation of the top of platform 103 to be the design elevation with wind turbine 2 installed, and then carrying out anchor positioning in an anchor chain chamber 1014 of a pontoon chamber 1013, and adjusting the lengths of the upper anchor chains 501 and the lower anchor chains 503 by anchor machine to install the anchor chain assembly on the outer cylindrical surface of the pontoon 101;

S5, installing a tower 3 on the top surface of the central cylinder 102, gradually unloading the sandbags on the platform 103, and installing the wind turbine 2 on a top of tower 3; then observing whether the pontoon carrier component is balanced, if not, placing a balancing counterweight 106 at the bottom of the pontoon 101 to ensure the pontoon carrier component is in balance in still water; then installing monitoring and electrical equipment for the wind turbine 2, and carrying out equipment debugging to complete the construction of a single floating power-generation wind turbine 2.

The pontoon carrier component of the present disclosure has a fully symmetrical structure, without directionality, which is convenient for the installation of the buoyancy support component and the wind turbine 2, and the load distribution of the fully symmetrical pontoon carrier component is relatively uniform. However, after the installation of the wind turbine 2, the load may become uneven. This can be adjusted by setting a balancing counterweight 106 at the bottom in the pontoon 101 to ensure that the offshore floating platform device is in a balanced state in still water.

The present disclosure further provides an operation method of an offshore floating platform device.

Figure 18:
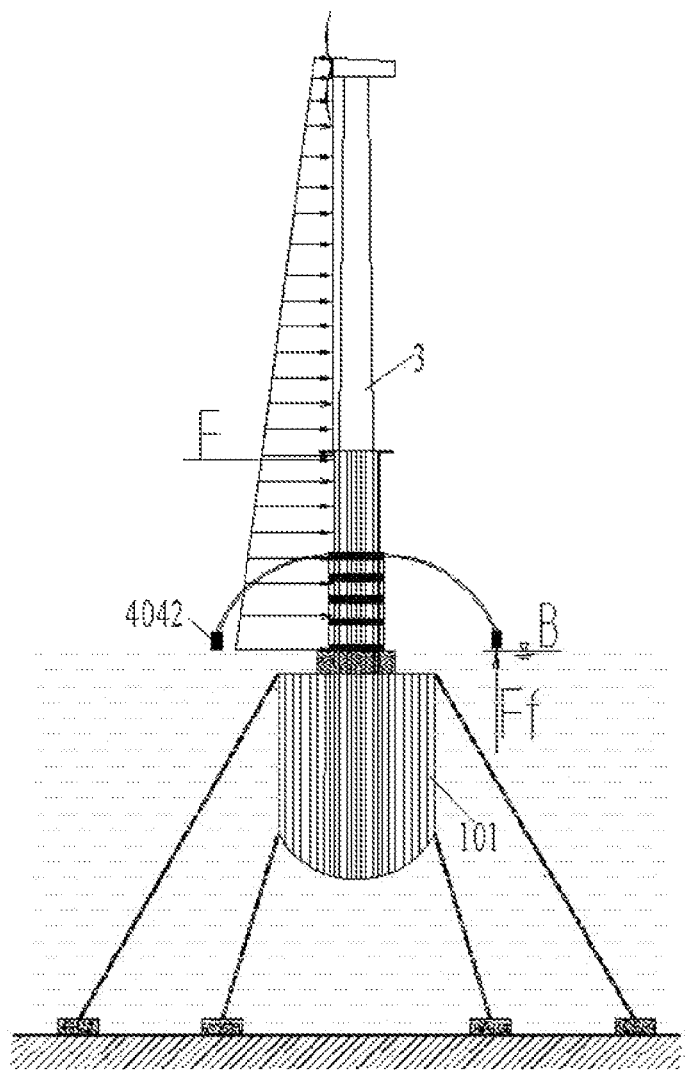
FIG. 18 is a schematic diagram of buoyancy support to an offshore floating platform device installed with a wind turbine.

The method includes: when the pontoon carrier component is relatively stable, the buoyancy support component is in a non-operational state; under the action of wind and waves, or when there is personnel activity on the top surface of the platform 103, the pontoon carrier component is tilted to one side; when the tilt reaches a set tilt value, the floating columns 4042 on the tilted side are immersed in the water and generate buoyancy, which automatically performs a reversed dynamic support for the pontoon carrier component and resists the overturning moment of the pontoon carrier component; the greater the angle of tilt of the pontoon carrier component, the greater the volume of the floating columns 4042 on the tilted side immersed in the water, and the greater the generated buoyancy, which can effectively control the swaying of the pontoon carrier component and restore the pontoon carrier component to a balanced state, see FIG. 18, in which B represents the lowest water level, F represents the combined force of wind and wave loads, and $F_f$ represents the buoyancy generated by the floating columns 4042 immersed in the water.

The pontoon carrier component satisfies the following balance equations under external loads: $\Sigma Q=0$, $\Sigma M=0$; in the equations, $\Sigma Q$ represents a sum of vertical external loads acting on the pontoon carrier component, and $\Sigma M$ represents a sum of moments of external loads acting on any point of the pontoon carrier component.

The stability calculation of the pontoon carrier component is carried out according to the following equation under the action of wind and waves or when there is personnel activity on the top surface of the platform 103:

$$K = \frac{\sum M_q}{\sum M_k};$$

in this equation, $\Sigma M_q$ represents a sum of overturning moments exerted by external loads on any point of the pontoon carrier component, including a sum of overturning moments of horizontal loads of waves, wind loads, and vertical loads generated by the activities of personnel on the top surface of the platform 103; $\Sigma M_k$ represents a sum of anti-overturning moments exerted by external loads on any point of the pontoon carrier component, that is, a sum of anti-overturning moments exerted by the buoyancy generated by the floating columns 4042 on the pontoon carrier component; K is less than or equal to 1.

The pontoon 101, the central cylinder 102, the platform 103, the pontoon boxes 401, the force transmission frames 402, the arc-shaped slots 4031, the rollers 4032, the arc-shaped rods 4041, and the floating columns 4042 of the offshore floating platform device of the present disclosure are all manufactured in the factory and then assembled, making it easy for the same components to be interchangeable. For different water depths, when the heights of the tower 3 of the wind turbine 2 are the same, the required pontoon carrier components are the same, and only the sizes of the upper moorings 502 and lower moorings 504, as well as the lengths of the upper anchor chains 501 and lower anchor chains 503, need to be adjusted. According to the different heights of the tower 3 (for example, the heights of the tower 3 may be 40 m, 50 m, 60 m, etc.), the pontoon carrier components can be serialized. Different heights of tower 3 bear different loads, so the required pontoon carrier components are also different. Corresponding pontoon carrier components can be designed according to different heights of the tower 3, and a pontoon carrier component is selected according to the height of tower 3 of the wind turbine 2, and then installation is proceeded.

The marine environment is harsh typhoons are frequent, and considering the late development of the floating wind turbine units which need to resist typhoons, it is difficult to analyze and calculate the floating wind turbine platform under the coupled action of aerodynamics and hydrodynamics. Under the action of waves or uneven load from the top surface of the platform 103, in order to reduce the sway of the wind turbine 2 and achieve basic stability, the volume of the pontoon 101 needs to be large, and multiple anchor chains need to be added. This not only increases the investment, but also does not have a significant effect. In response to the defects of existing floating wind turbine platforms, the buoyancy support component set by the present disclosure can be used to adjust the balance using buoyancy, reduce the sway of the pontoon carrier component due to wind and wave impact, and automatically control the stability of the pontoon carrier component. In addition, the stability of traditional floating wind turbine platforms cannot be accurately calculated in complex marine environments under different draft, wind angles, wind speeds, etc. The present disclosure does not require complex calculations. The sizes of the floating columns 4042 are calculated based on the required buoyancy at the lowest water level, where the required buoyancy is obtained on the basis of the maximum wind speed in the wind direction over the years, in order to maximize the reduction of the impact of wind and waves.

The above are only the preferred embodiments of the present disclosure. It should be noted that for those skilled in the art, various improvements and substitutions can be made without departing from the technical principles of the present disclosure, and these improvements and substitutions should also be considered within the scope of the present disclosure.

What is claimed is:

1. An offshore floating platform device, comprising a pontoon carrier component,
    wherein the pontoon carrier component comprises a pontoon (101);
    wherein a counterweight body is provided at a bottom of the pontoon (101), and a central cylinder (102) is provided at a top of the pontoon (101); wherein an anchor chain component is provided on an outer cylindrical surface of the pontoon (101) for keeping an elevation of the pontoon carrier component in a sea;
    wherein a platform (103) is provide around an edge of a top surface of the central cylinder (102); wherein a plurality of tower bases (104) is provided on the top surface of the central cylinder (102) for installing a tower (3) of a wind turbine (2); wherein a buoyancy support component is provided on an outer cylindrical surface of the central cylinder (102);
    wherein the buoyancy support component is configured to ascend and descend as it rolls along the outer cylindrical surface of the central cylinder (102) in response to changes in water level;
    wherein the buoyancy support component comprises two symmetrical semi-circular ring-shaped pontoon boxes (401);
    wherein the two pontoon boxes (401) are arranged around an outer side of the central cylinder (102) and are spliced to form a pontoon box body, wherein the pontoon box body is located below a sea surface;
    wherein a plurality of columns (4021) is evenly distributed on an inner edge of a top surface of each of the two pontoon boxes (401), wherein the columns (4021) are connected from top to bottom through a plurality of horizontal arc beams (4022) to form one force transmission frame (402);
    wherein two force transmission frames (402) are arranged around the outer side of the central cylinder (102) and spliced to form a force transmission frame body;
    wherein an inner side of the plurality of arc beams (4022) is provided with a arc-shaped slot (4031) having a conforming shape with the plurality of arc beams (4022);
    wherein a plurality of rollers (4032) is provided in the arc-shaped slot (4031), and the plurality of rollers (4032) is in rolling contact with the outer cylindrical surface of the central cylinder (102);
    wherein a plurality of buoyancy support assemblies is provided on an outer side of the plurality of arc beams (4022) at a top of the plurality of columns (4021) in a circumferential direction of the central cylinder (102).

2. The offshore floating platform device according to claim 1, wherein a diameter of the pontoon (101) is larger than a diameter of the central cylinder (102), and the central cylinder (102) is in a middle of a top surface of the pontoon (101);
    wherein the plurality of tower bases (104) is distributed around the top surface of the central cylinder (102);
    wherein a plurality of vertical partitions (1011) is evenly distributed around a circumference in the pontoon (101), wherein the vertical partitions (1011) are connected through a plurality of horizontal partitions (1021) from top to bottom, forming a plurality of pontoon chambers (1013);
    wherein the plurality of horizontal partitions (1021) is sequentially arranged from top to bottom in the central cylinder (102), forming a plurality of central cylinder chambers (1022);
    wherein a ladder is provided on an inner wall of the central cylinder (102);
    wherein the plurality of pontoon chambers (1013) and the plurality of central cylinder chambers (1022) are intercommunicated, and part of the plurality of pontoon chambers (1013) are provided with an anchor chain chamber (1014) and anchor machine for installing the anchor chain component.

3. The offshore floating platform device according to claim 1, wherein the counterweight body comprises an arc-shaped counterweight (105) and a balancing counterweight;
    wherein an axis of the arc-shaped counterweight (105) coincides with an axis of the pontoon (101);
    wherein the arc-shaped counterweight (105) comprises an arc-shaped steel mesh (1051);
    wherein a top of the arc-shaped steel mesh (1051) is provided with an opening, and a diameter of the opening is equal to a diameter of the pontoon (101);
    wherein a top of the arc-shaped steel mesh (1051) is connected to the bottom of the pontoon (101);
    wherein an inner surface of the arc-shaped steel mesh (1051) is bonded with geotextile to form an arc-shaped cavity, in which a plurality of suspension bars (1052) is installed;
    wherein one end of each of the suspension bars (1052) is connected to the arc-shaped steel mesh (1051), and the other end is connected to the bottom of the pontoon (101);

wherein a plurality of filling holes (1017) is provided on a bottom plate of the pontoon (101) for pouring concrete into the arc-shaped cavity; and wherein the balancing counterweight (106) is placed at the bottom within the pontoon (101) for adjusting balance of the pontoon carrier component after installation of the wind turbine (2).

4. The offshore floating platform device according to claim 1, wherein the plurality of buoyancy support assemblies is uniformly distributed along a circumference of the central cylinder (102);

wherein each of the plurality of buoyancy support assemblies comprises an arc-shaped rod (4041) with a concave side facing downwards;

wherein a top of the arc-shaped rod (4041) is connected to a corresponding position on the outer side of the plurality of arc beams (4022), and a bottom of the arc-shaped rod (4041) is provided with a hollow floating column (4042);

wherein a bottom of the floating column (4042) is higher than a static water level.

5. The offshore floating platform device according to claim 1, wherein each of two ends of each of the two pontoon boxes (401) is provided with a vertical and outward-extending pontoon box connecting plate (4011), and the pontoon box connecting plates (4011) at corresponding ends of the two pontoon boxes (401) are connected by bolts;

wherein a vertical and outward-extending frame connecting plate (4023) is provided at the column (4021) on each of two ends of each of the two force transmission frames (402), wherein the frame connecting plates (4023) at corresponding ends of the two force transmission frames (402) are connected by bolts.

6. The offshore floating platform device according to claim 1, wherein the anchor chain assembly comprises a plurality of upper anchor chain components uniformly arranged around an upper end of the outer cylindrical surface of the pontoon (101) and a plurality of lower anchor chain components uniformly arranged around a lower end of the outer cylindrical surface of the pontoon (101);

wherein each of the plurality of upper anchor chain components comprises an upper anchor chain (501) inclined outward and downward;

wherein an upper end of the upper anchor chain (501) is connected to a corresponding position on the upper end of the outer cylindrical surface of the pontoon (101), and a lower end of the upper anchor chain (501) is connected to an upper mooring (502) located on a seabed;

wherein each of the plurality of lower anchor chain components comprises a lower anchor chain (503) inclined outward and downward;

wherein an upper end of the lower anchor chain (503) is connected to a corresponding position on the lower end of the outer cylindrical surface of the pontoon (101), and a lower end of the lower anchor chain (503) is connected to a lower mooring (504) located on the seabed;

wherein the plurality of upper anchor chains (501) and the plurality of lower anchor chains (503) are arranged in a staggered manner.

7. A method for constructing the offshore floating platform device according to claim 1, comprising: S1, producing the pontoon (101), the counterweight body, the central cylinder (102), the platform (103), the buoyancy support component, and the anchor chain assembly by a factory; S2, assembling the counterweight body and the center cylinder (102) to the pontoon (101) respectively, assembling the platform (103) with the center cylinder (102) to obtain the pontoon carrier component, and towing the pontoon carrier component in water to an on-site water area; S3, on a top surface of the pontoon (101), mounting the buoyancy support component on the outer cylindrical surface of the center cylinder (102); S4, when a water level in the on-site water area reaches a lowest level, loading sandbags on a top of the platform (103) to enable an elevation of the top of platform (103) to be a design elevation in which the wind turbine (2) is installed; installing the anchor chain assembly on the outer cylindrical surface of the pontoon (101), so that the pontoon (101) is under a sea surface; and S5, installing the tower (3) on the top surface of the central cylinder (102), gradually unloading the sandbags on the platform (103), and installing the wind turbine (2) on a top of the tower (3).

8. The method for constructing the offshore floating platform device according to claim 7, wherein in S1, the producing of the counterweight body by the factory comprises: producing an arc-shaped steel mesh (1051) of the counterweight body and a plurality of suspension bars (1052) by the factory, bonding geotextile on an inner surface of the arc-shaped steel mesh (1051), connecting one end of each of a plurality of suspension bars (1052) to the arc-shaped steel mesh, and producing a balancing counterweight (106) of the counterweight body by the factory;

in S2, docking a bottom of the central cylinder (102) with the top of the pontoon (101) and welding them on a ship, socketing the platform (103) on an outer side of a top of central cylinder (102) and welding the platform (103) with the central cylinder (102), connecting a top of the arc-shaped steel mesh (1051) to a bottom of the pontoon (101), connecting the other end of each of the plurality of suspension bars (1052) at a corresponding position on the bottom of the pontoon (101), floating the pontoon (101) on a water surface, and pouring concrete into an arc-shaped cavity through a plurality of filling holes (1017) on a bottom plate of the pontoon (101) to obtain the pontoon carrier component;

in S5, after installing the wind turbine (2), observing whether the pontoon carrier component is balanced, if not, placing the balancing counterweight (106) at the bottom in the pontoon (101) to ensure the pontoon carrier component is in balance in still water.

9. An operation method of the offshore floating platform device according to claim 1, comprising: when the pontoon carrier component is relatively stable, the buoyancy support component is in a non-operational state; when the pontoon carrier component is tilted under an action of wind and waves, a plurality of floating columns (4042) of a plurality of buoyancy support assemblies is immersed in water to generate buoyancy, which generates a supporting action on the pontoon carrier component, resists an overturning moment of the pontoon carrier component, and restores the pontoon carrier component to a balanced state.

* * * * *